(No Model.)

E. FANNING.
WEEDER ATTACHMENT FOR SULKY CULTIVATORS.

No. 564,478. Patented July 21, 1896.

Witnesses:
F. L. Durand
W. L. Coombs

Inventor:
Edgar Fanning,
Louis Bagger & Co.
Attorneys.

THE NORRIS PETERS CO., PHOTO-LITHO., WASHINGTON, D. C.

UNITED STATES PATENT OFFICE.

EDGAR FANNING, OF RIVERHEAD, NEW YORK.

WEEDER ATTACHMENT FOR SULKY CULTIVATORS.

SPECIFICATION forming part of Letters Patent No. 564,478, dated July 21, 1896.

Application filed January 15, 1896. Serial No. 575,599. (No model.)

*To all whom it may concern:*

Be it known that I, EDGAR FANNING, a citizen of the United States, and a resident of Riverhead, Long Island, in the county of Suffolk and State of New York, have invented certain new and useful Improvements in Weeder Attachments to Sulky-Cultivators; and I do hereby declare that the following is a full, clear, and exact description of the invention, which will enable others skilled in the art to which it appertains to make and use the same, reference being had to the accompanying drawings, which form a part of this specification.

My invention relates to improvements in weeding attachments for sulky-cultivators, which travels in the rear of the cultivator and breaks up the earth turned by the shovels and tears up all fine weeds and removes obstructions from the row.

The object of the invention is to provide an improved construction of the same which shall possess superior advantages with respect to efficiency in operation; and it consists in the novel construction and combination of parts, hereinafter fully described and claimed.

Figure 1:
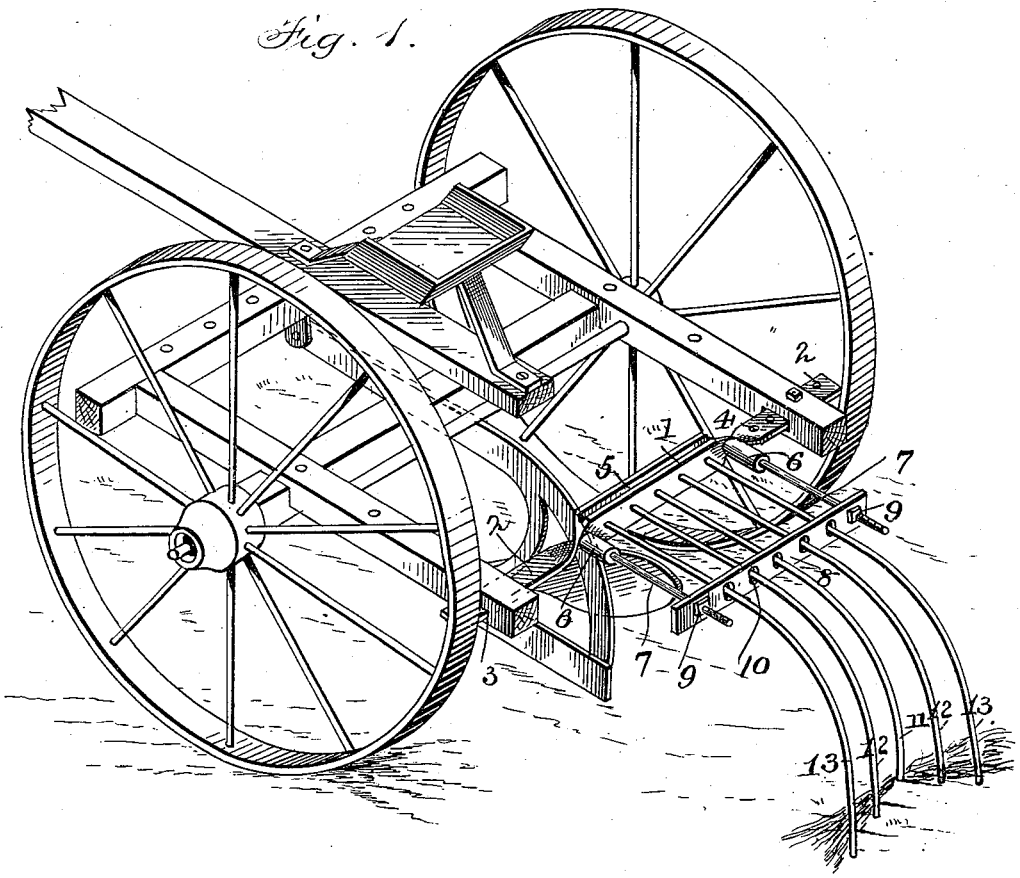
Figure 2:
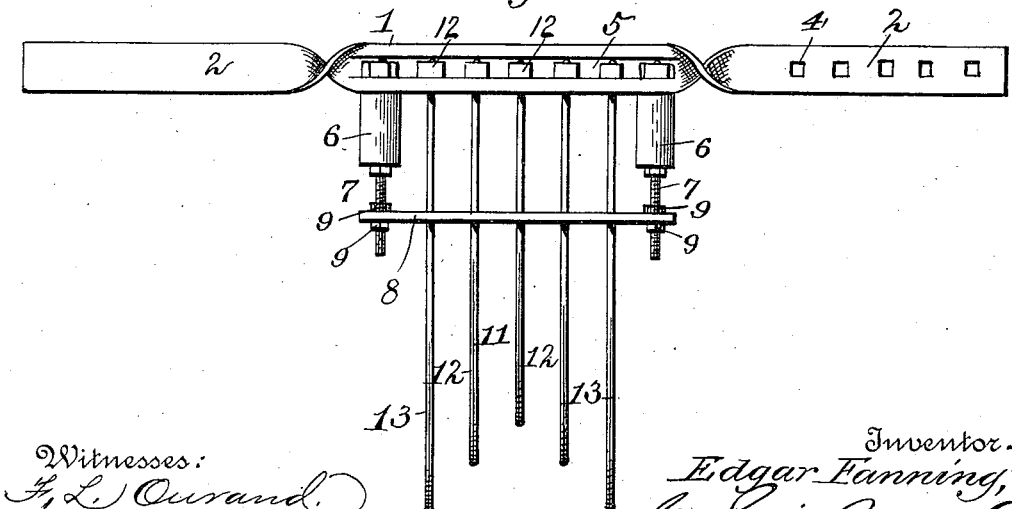

In the accompanying drawings, Figure 1 is a perspective view of a sulky-cultivator with my improvements applied thereto. Fig. 2 is a plan view of the weeder attachment.

In the said drawings, the reference numeral 1 designates a metal plate formed with two laterally-extending arms 2, which slide in slots 3 in the cultivator-frame and one of which is formed with a series of apertures 4 for the passage of a bolt or pin by which the attachment is held in place in said frame. By removing the pin or bolt and sliding the plate to the right or left the plate can be adjusted laterally. The front of the plate, on its upper side, is formed with a channel 5. Formed integral with said plate are two studs 6, to which are secured two rearwardly-extending screw-threaded rods 7, which pass through apertures in a bar 8. Nuts 9 secure this bar in place, and the latter may be adjusted in and out by means thereof. This bar is formed with a number of apertures 10, through which pass curved downwardly-depending teeth numbered, respectively, 11, 12 12, and 13 13. The inner tooth 11 is shorter than the next teeth 12 12 at the rear and sides thereof, which in turn are shorter than the outer teeth 13 13, and all are so arranged as to form a V-shaped space therebetween. These teeth pass loosely through the apertures 10, so as to move up and down therein, and their front ends pass through apertures in the plate 1 into the groove 5, when they are secured in place by nuts 12.

The operation is as follows: The attachment is secured to the rear of a cultivator so that the teeth travel in the row formed by the shovels, and the teeth will catch and tear small weeds and throw obstructions out of the row and break up the soil.

Having thus fully described my invention, what I claim is—

The combination with a sulky-cultivator, of the channel-plate, provided with apertures, and formed with laterally-extending arms passing through slots in the cultivator-frame and one of said arms formed with a series of apertures, the retaining-pin engaging therewith, the studs, the screw-rods connected therewith, the apertured bar connected with said rods, the nuts, and the curved teeth of differential lengths passing loosely through the apertured bar and through the apertures in the channel-plate, and the nuts engaging therewith, substantially as described.

In testimony that I claim the foregoing as my own I have hereunto affixed my signature in presence of two witnesses.

EDGAR FANNING.

Witnesses:
GEORGE F. STACKPOLE,
IRVING G. BLAUVELT.